(12) United States Patent
Zhang et al.

(10) Patent No.: US 11,102,469 B2
(45) Date of Patent: Aug. 24, 2021

(54) 3D PLAY SYSTEM

(71) Applicant: BOE Technology Group Co., Ltd., Beijing (CN)

(72) Inventors: Zhiguo Zhang, Beijing (CN); Qingjiang Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/749,609

(22) Filed: Jan. 22, 2020

(65) Prior Publication Data

US 2020/0162723 A1     May 21, 2020

Related U.S. Application Data

(62) Division of application No. 15/521,724, filed as application No. PCT/CN2016/075199 on Mar. 1, 2016, now abandoned.

(30) Foreign Application Priority Data

Sep. 10, 2015   (CN) .......................... 201510575877.8

(51) Int. Cl.
   *H04N 13/344*     (2018.01)
   *G02B 15/00*      (2006.01)
   *H04N 13/398*     (2018.01)

(52) U.S. Cl.
   CPC ........... *H04N 13/344* (2018.05); *G02B 15/00* (2013.01); *H04N 13/398* (2018.05)

(58) Field of Classification Search
   CPC ..... H04N 13/344; H04N 13/398; G02B 15/00

USPC .......................................................... 348/53
   See application file for complete search history.

(56) References Cited

U.S. PATENT DOCUMENTS

| | | | |
|---|---|---|---|
| 6,008,778 A | 12/1999 | Takahashi et al. | |
| 2007/0252953 A1 | 11/2007 | Metzger et al. | |
| 2013/0169887 A1 | 7/2013 | Wu et al. | |
| 2014/0152531 A1 | 6/2014 | Murray et al. | |
| 2015/0067521 A1* | 3/2015 | Heo .................... | G09G 5/12 |
| | | | 715/733 |
| 2015/0348327 A1 | 12/2015 | Zalewski | |
| 2016/0011425 A1 | 1/2016 | Thurber et al. | |

(Continued)

FOREIGN PATENT DOCUMENTS

| | | |
|---|---|---|
| CN | 201854334 U | 6/2011 |
| CN | 102137269 A | 7/2011 |

(Continued)

OTHER PUBLICATIONS

Jun. 3, 2016—(WO) International Search Report and Written Opinion Appn PCT/CN2016/075199 with English Tran.

(Continued)

*Primary Examiner* — Susan E. Hodges
(74) *Attorney, Agent, or Firm* — Banner & Witcott, Ltd.

(57) ABSTRACT

A 3D play system which includes a head-mounted/headset device. The head-mounted device includes a supporting structure, a first lens, and a second lens. The supporting structure is configured to support two display devices. The first lens is configured to zoom an image displayed by a first display device and project the zoomed image onto a left eye. The second lens is configured to zoom an image displayed by a second display device and project the zoomed image onto a right eye.

9 Claims, 1 Drawing Sheet

(56) References Cited

U.S. PATENT DOCUMENTS

2016/0187969 A1   6/2016  Larsen et al.
2017/0010471 A1   1/2017  Serrano Canvas et al.
2017/0054969 A1*  2/2017  Lu .......................... G02B 30/36

FOREIGN PATENT DOCUMENTS

| CN | 102740088 A | 10/2012 |
| --- | --- | --- |
| CN | 102905148 A | 1/2013 |
| CN | 102937745 A | 2/2013 |
| CN | 204465756 U | 7/2015 |
| CN | 105120253 A | 12/2015 |

OTHER PUBLICATIONS

Aug. 26, 2016—(CN) First Office Action Appn 201510575877.8 with English Tran.
Apr. 19, 2017—(CN) Second Office Action Appn 201510575877.8 with English Tran.
Sep. 7, 2017—(CN) Third Office Action Appn 201510575877.8 with English Tran.

\* cited by examiner

3D PLAY SYSTEM

CROSS-REFERENCE

The application is a divisional of U.S. patent application Ser. No. 15/521,724, filed on Apr. 25, 2017, which is a U.S. National Phase Entry of International Application PCT/CN2016/075199 filed on Mar. 1, 2016, claiming priority to Chinese Patent Application No. 201510575877.8 filed on Sep. 10, 2015. The present application claims priority to and the benefit of the above-identified applications and the above-identified applications are incorporated by reference herein in their entirety.

TECHNICAL FIELD

Embodiments of the present disclosure relate to a 3D play system.

BACKGROUND

With the rapid development of display technology, 3D technology has been gradually penetrated into the daily life. Due to 3D technology, images can be stereoscopic and vivid. The most basic principle of 3D technology is to allow a left eye and a right eye of the human being to respectively receive different images, and form an image with 3D effect in the fore-and-aft, up-and-down, left-and-right, far-and-near directions by the superimposition and regeneration of the image information via the brain.

Currently, 3D images are mostly in the stage of being applied in cinemas, computers or televisions, and special glasses of the cinemas must be used or viewing devices must be prepared by users themselves. Thus, there is a requirement to the viewing environment, and it is not convenient for viewing 3D images by users.

SUMMARY

Embodiments of the present disclosure provide a 3D play system, which includes a head-mounted device. The head-mounting device includes a supporting structure, a first lens and a second lens. The supporting structure is configured to support two display devices. The first lens is configured to zoom an image displayed by a first display device and project the zoomed image into a left eye; and the second lens is configured to zoom an image displayed by a second display device and project the zoomed image into a right eye.

For example, the first display device is configured to play a first video including a plurality of frames; and the second display device is configured to play a second video including a plurality of frames. The 3D play system further includes a first play control terminal and a second play control terminal. The first play control terminal is configured to generate a synchronization signal according to the progress of playing the first video of the first display device, and send the generated synchronization signal to the second play control terminal. The second play control terminal is configured to adjust the progress of playing the second video of the second display device after receiving the synchronization signal sent by the first play control terminal, and synchronize the second video played by the second display device and the first video played by the first display device.

For example, the first play control terminal is configured to take the frame number of an image required to be displayed by the first display device in the next frame as the synchronization signal, and send the synchronization signal to the second play control terminal. The second play control terminal is configured to play an image with corresponding frame number in the second video after receiving the synchronization signal.

For example, the first play control terminal is configured to send the synchronization signal to a wireless communication interface of the second display device through a wireless communication interface of the first display device. The second play control terminal is configured to receive the synchronization signal sent by the first play control terminal through the wireless communication interface of the second display device.

For example, the wireless communication interfaces are Bluetooth communication interfaces.

For example, the 3D play system further includes a first play control terminal, a second play control terminal and a handheld control device. The head-mounted device further includes a main controller and three communication interfaces connected with the main controller. The handheld control device is provided with a communication interface and configured to determine a play control command inputted by a user and send the play control command to a third communication interface among the three communication interfaces through the communication interface of the handheld control device. The main controller is configured to send the play control command received from the third communication interface to the first play control terminal through a first communication interface among the three communication interfaces, and send the play control command to the second play control terminal through a second communication interface among the three communication interfaces. Both the first play control terminal and the second play control terminal are configured to control the play of corresponding display device according to the play control command after receiving the play control command sent by the main controller of the head-mounted device.

For example, the handheld control device includes at least one play control button and a controller connected with the play control buttons; and the controller is configured to determine the play control command inputted by a user according to the play button triggered by the user, and send the play control command to the third communication interface among the three communication interfaces through the communication interface of the handheld control device.

For example, both the first communication interface and the second communication interface are wired interfaces and configured to be connected with wired interfaces of the display devices. The main controller is configured to send the play control command to the wired interfaces of corresponding display devices through the first communication interface and the second communication interface. The first play control terminal and the second play control terminal are configured to receive the play control command sent by the main controller through the wired interfaces of the display devices provided with the play control terminals.

For example, the first communication interface, the second communication interface and the wired interfaces of the display devices are all USB interfaces.

For example, both the third communication interface and the communication interface of the handheld control device are Bluetooth communication interfaces.

For example, the first lens and the second lens are non-spherical lenses.

BRIEF DESCRIPTION OF THE DRAWINGS

Embodiments of the present disclosure will be described in more detail below with reference to accompanying drawings to allow an ordinary skill in the art to more clearly understand embodiments of the present disclosure, in which.

DETAILED DESCRIPTION

Technical solutions according to the embodiments of the present disclosure will be described clearly and fully as below in conjunction with the accompanying drawings of embodiments of the present disclosure. It is apparent that the described embodiments are just a part but not all of the embodiments of the disclosure. Based on the described embodiments herein, a person of ordinary skill in the art can obtain other embodiment(s), without any creative work, which shall be within the scope of the present disclosure.

Unless otherwise defined, all the technical and scientific terms used herein have the same meanings as commonly understood by a person of ordinary skill in the art to which the present disclosure belongs. The terms, such as "first," "second," or the like, which are used in the description and the claims of the present disclosure, are not intended to indicate any sequence, amount or importance, but for distinguishing various components. Also, the terms, such as "a," "an," "the," or the like, are not intended to limit the amount, but may be for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Figure 1:
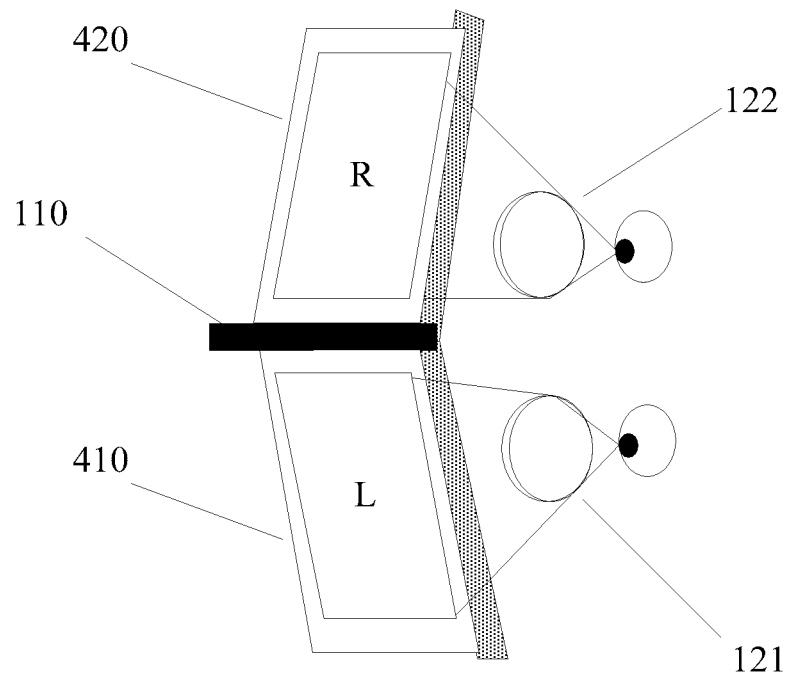
FIG. 1 is a schematic structural view of a head-mounted device in a 3D play system provided by a first embodiment of the present disclosure.
Figure 2:
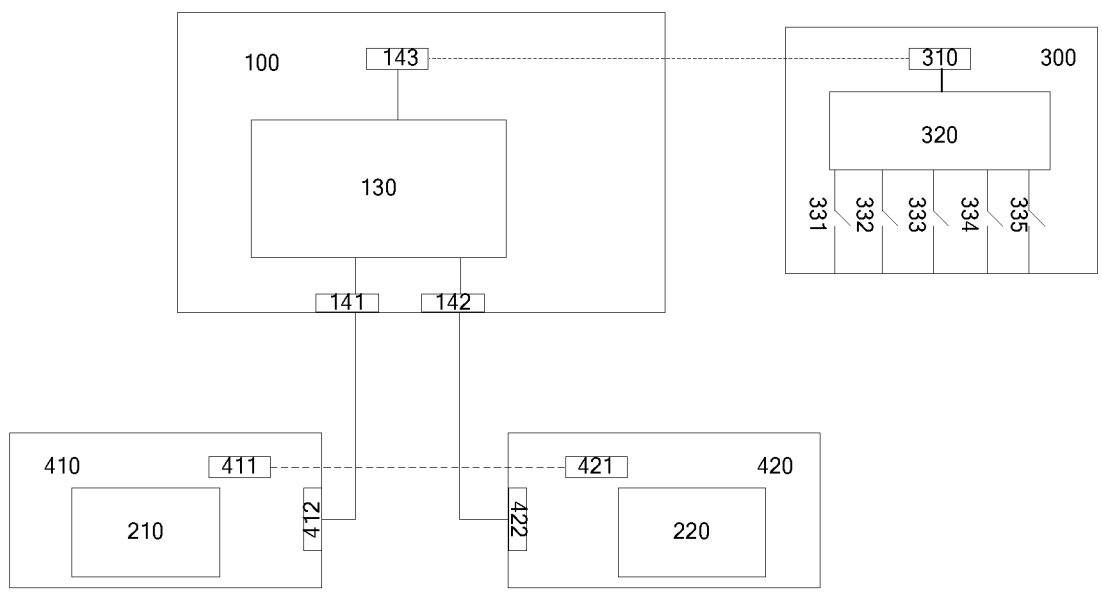
FIG. 2 is a circuit connection diagram of the head-mounted device and a handheld control device in the 3D play system provided by the first embodiment of the present disclosure.

The embodiment of the present disclosure provides a 3D play system. As illustrated in FIGS. 1 and 2, the 3D play system may include a head-mounted/headset device 100. The head-mounted device 100 includes a supporting structure 110, a first lens 121 and a second lens 122. The supporting structure 110 can support two display devices (e.g., mobile phones, which are labeled as 410 and 420 in the figure). The first lens 121 can zoom an image L displayed by a first display device 410 and project the zoomed image into a left eye, and the second lens 122 can zoom an image R displayed by a second display device 420 and project the zoomed image into a right eye.

By adoption of the 3D play system, the play and viewing of 3D images can be achieved by placing the two display devices 410 and 420, e.g., the mobile phones, on the supporting structure 110 of the head-mounted device, so as to allow the first display device 410 to play 2D images corresponding to the left eye and allow the second display device 420 to play 2D images corresponding to the right eye. This design has low requirement on the viewing environment and users can view the 3D images at all times and places. Moreover, in the embodiment of the present disclosure, high resolution is obtained by adopting two display devices to respectively play corresponding images.

In an example, a barrier may be disposed in the center of the supporting structure 110 to separate the first display device 410 from the second display device 420. Moreover, for instance, the barrier may be an opaque barrier, so as to avoid the mutual crosstalk between the images displayed by the first display device 410 and the second display device 420.

In an example, the first display device 410 and the second display device 420 may be a device capable of playing a video including a plurality of frames. For convenient description, it is supposed that a video played by the first display device 410 is a first video and a video played by the second display device 420 is a second video.

The 3D play system may further include a first play control terminal 210 and a second play control terminal 220.

The first play control terminal 210 here may be mounted on the first display device 410 and is configured to generate a synchronization signal according to the progress of playing the first video of the first display device 410, and send the generated synchronization signal to the second play control terminal 220.

The second play control terminal 220 may be mounted on the second display device 420 and is configured to adjust the play progress of playing the second video of the second display device 420 after receiving the synchronization signal sent by the first play control terminal 210, and synchronize the second video played by the second display device 420 and the first video played by the first display device 410.

In this way, the process of synchronizing the first video played by the first display device 410 and the second video played by the second display device 420 is automatically completed, and the process of synchronizing the videos by manual adjustment of the play progress of the videos is not required, so that the use experience of users can be improved.

In an example, the first play control terminal 210 here may send the synchronization signal according to a preset cycle, or may also send the synchronization signal after receiving a synchronization command sent by a user.

In an example, as shown in FIG. 2, the first play control terminal 210 may be configured to send the synchronization signal to a wireless communication interface 421 in the second display device 420 through a wireless communication interface 411 in the first display device 410, and the second play control terminal 220 may receive the synchronization signal sent by the first play control terminal 210 through the wireless communication interface 421 in the second display device 420.

In an example, the wireless communication interfaces 411 and 412 here may be Bluetooth communication interfaces.

In an example, the first play control terminal 210 here is configured to take the frame number of an image required to be displayed by the first display device 410 in the next frame as the synchronization signal, and send the synchronization signal to the second play control terminal 220.

The second play control terminal 220 is configured to play an image with corresponding frame number in the second video after receiving the synchronization signal.

This way is relatively simple and can accurately achieve synchronization. In application, the synchronization signal may also be in other forms. The adoption of forms of the synchronization signal may not affect the embodiments of the present disclosure on the premise of being able to achieve synchronization, and corresponding technical proposals shall also fall within the scope of the present disclosure.

As illustrated in FIG. 2, in an example, the 3D play system may further include a handheld control device 300.

The head-mounted device 100 may include a main controller 130 and three communication interfaces 141, 142 and 143 connected with the main controller 130. The handheld control device 300 is provided with a communication interface 310 and configured to determine a play control command inputted by a user, and send the play control command to a third communication interface 143 among the three communication interfaces connected with the main controller 130 through the communication interface 310.

The main controller 130 is configured to send the play control command received from the third communication interface 143 to the first play control terminal 210 through a first communication interface 141 among the three communication interfaces connected with the main controller 130, and send the play control command to the second play control terminal 220 through a second communication interface 142.

Both the first play control terminal 210 and the second play control terminal 220 are configured to control the play of corresponding display devices according to the play control command after receiving the play control command sent by the main controller 130 of the head-mounted device 100.

In this way, the play control of the first display device 410 and the second display device 420 can be simultaneously achieved by a single handheld control device. The play control command here may refer to a command, such as enlarging an image, changing film source, fast forward and rewind/backward.

In an example, as shown in FIG. 2, the handheld control device 300 may include at least one play control button (FIG. 2 takes 5 play control buttons as an example, which are respectively represented by 331, 332, 333, 334 and 335) and a controller 320 connected with the play control buttons. The controller 320 is configured to determine the play control command inputted by a user according to the play button triggered by a user, and send the play control command to the third communication interface 143 in the head-mounted device 100 through the communication interface 310.

The handheld device is convenient for a user to select corresponding command and can conveniently achieve play control.

In an example, as shown in FIG. 2, both the first communication interface 141 and the second communication interface 142 are wired interfaces and respectively configured to be connected with a wired interface 412 of the first display device 410 and a wired interface 422 of the second display device 420.

The main controller 130 is configured to send the play control command to the wired interface 412 of the first display device 410 through the first communication interface 141, and send the play control command to the wired interface 422 of the second display device 420 through the second communication interface 142.

The first play control terminal 210 receives the play control command sent by the main controller 130 through the wired interface 412 of the first display device 410. The second play control terminal 220 receives the play control command sent by the main controller 130 through the wired interface 422 of the second display device 420.

For display devices, such as the mobile phones including the Bluetooth communication interfaces, when the Bluetooth communication interfaces are used for achieving the communication between the first play control terminal 210 and the second play control terminal 220, normally, the Bluetooth communication interfaces cannot be used for achieving the communication with the head-mounted device 100 again.

In the embodiments of the present disclosure, the connection of the head-mounted device 100 and the first display device 410 and the second display device 420 through the wired interfaces avoids communication conflict.

In an example, the first communication interface 141 and the second communication interface 142 here and the wired interfaces 412 and 422 of the display devices may be all USB interfaces. The third communication interface 142 and the communication interface 310 of the handheld control device 300 may be Bluetooth communication interfaces.

In an example, the first lens and/or the second lens here is a non-spherical lens, so that the zoom effect of corresponding display images can be improved.

It is understood that, in an example, the first play control terminal 210 and the second play control terminal 220 do not need to simultaneously have the synchronization function and the function of controlling the display devices according to the play control command of a user, and the missing of one function will not affect the implementation of the other function, so corresponding technical proposals shall also fall within the scope of the present disclosure.

The 3D play system provided by the embodiments of the present disclosure includes a head-mounted device. The head-mounted device includes a supporting structure, a first lens and a second lens. The supporting structure is configured to support two display devices. The first lens is configured to zoom an image displayed by a first display device and project the zoomed image into a left eye. The second lens is configured to zoom an image displayed by a second display device and project the zoomed image into a right eye. By adoption of the 3D play system provided by the embodiments of the present disclosure, the play and viewing of corresponding 3D images can be achieved by placing the two display devices (e.g., mobile phones) into the head-mounted device and allowing the two display devices to respectively display corresponding 2D images. In this way, the requirement to the viewing environment is less and users can view the 3D images at all times and places.

The described above are only exemplary embodiments of the present disclosure. For one of ordinary skill in the art, various changes and alternations may be made without departing from the technical scope of the present disclosure, and all of these changes and alternations shall fall within the scope of the present disclosure.

The application claims priority to the Chinese patent application No. 201510575877.8 filed on Sep. 10, 2015 and entitled "3D Play System", which is incorporated herein by reference in its entirety.

What is claimed is:

1. A 3D play system, comprising a head-mounted device, wherein
   the head-mounted device comprises a supporting structure, a first lens, and a second lens;
   the supporting structure is configured to support two display devices;
   the first lens is configured to zoom an image displayed by a first display device and project the zoomed image into a left eye of a user;
   the second lens is configured to zoom an image displayed by a second display device and project the zoomed image into a right eye of the user;
   the first display device is configured to play a first video including a plurality of frames, the second display device is configured to play a second video including a plurality of frames, and the 3D play system further comprises a first play control terminal and a second play control terminal;

an opaque barrier is provided in a center of the supporting structure and configured to separate the first display device and the second display device;

the first play control terminal is configured to generate a synchronization signal according to a progress of playing the first video by the first display device, and send the generated synchronization signal to the second play control terminal; and the second play control terminal is configured to: after receiving the synchronization signal sent by the first playing control terminal, adjust a playing progress of playing the second video by the second display device, so that the second video played by the second display device and the first video played by the display device are synchronized.

2. The 3D play system according to claim 1, wherein the first play control terminal is configured to take a frame number of an image required to be displayed by the first display device in a next frame as the synchronization signal, and send the synchronization signal to the second play control terminal; and the second play control terminal is configured to play an image with a corresponding frame number in the second video after receiving the synchronization signal.

3. The 3D play system according to claim 1, wherein the first lens and the second lens are non-spherical lenses.

4. The 3D play system according to claim 1, wherein the first lens or the second lens is a non-spherical lens.

5. The 3D play system according to claim 2, wherein the first lens and the second lens are non-spherical lenses.

6. The 3D play system according to claim 2, wherein the first lens or the second lens is a non-spherical lens.

7. The 3D play system according to claim 1, further comprising a handheld control device, wherein the handheld control device comprises a second Bluetooth interface, the second Bluetooth interface of the handheld control device is communicated with a first Bluetooth interface of the head-mounted device.

8. The 3D play system according to claim 1, wherein the head-mounted device further comprises a first wired communication interface, a second wired communication interface, and a first Bluetooth interface; and the first display device comprises a third wired interface communicated with the first wired communication interface of the head-mounted device; and the second display device comprises a fourth wired interface communicated with the second wired communication interface of the head-mounted device.

9. The 3D play system according to claim 8, wherein the first display device further comprises a third Bluetooth interface; and the second display device further comprises a fourth Bluetooth interface, and the third Bluetooth interface is communicated with the fourth Bluetooth interface.

* * * * *